US009212084B2

(12) United States Patent
Wang et al.

(10) Patent No.: US 9,212,084 B2
(45) Date of Patent: Dec. 15, 2015

(54) ALUMINOSILICATE GLASS FOR TOUCH SCREEN

(75) Inventors: Chong Wang, Jiangsu (CN); José Zimmer, Losheim am See (DE)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 0 days.

(21) Appl. No.: 13/515,227

(22) PCT Filed: Dec. 10, 2010

(86) PCT No.: PCT/CN2010/002010

§ 371 (c)(1),
(2), (4) Date: Sep. 18, 2012

(87) PCT Pub. No.: WO2011/069338

PCT Pub. Date: Jun. 16, 2011

(65) Prior Publication Data

US 2013/0202715 A1 Aug. 8, 2013

(30) Foreign Application Priority Data

Dec. 11, 2009 (CN) .......................... 2009 1 0253263

(51) Int. Cl.

| | |
|---|---|
| ***A01N 59/16*** | (2006.01) |
| ***C03C 4/00*** | (2006.01) |
| ***C03C 3/085*** | (2006.01) |
| ***C03C 3/095*** | (2006.01) |
| ***C03C 21/00*** | (2006.01) |
| ***C03C 3/087*** | (2006.01) |
| *G06F 3/041* | (2006.01) |

(52) U.S. Cl.

CPC . *C03C 4/00* (2013.01); *C03C 3/085* (2013.01); *C03C 3/087* (2013.01); *C03C 3/095* (2013.01); *C03C 21/002* (2013.01); *G06F 3/041* (2013.01)

(58) Field of Classification Search

None

See application file for complete search history.

(56) References Cited

U.S. PATENT DOCUMENTS

| | | | | |
|---|---|---|---|---|
| 5,895,768 | A | 4/1999 | Speit | |
| 2003/0092556 | A1 | 5/2003 | Kohli | |
| 2007/0172661 | A1 * | 7/2007 | Fechner et al. | 428/409 |
| 2008/0286548 | A1 | 11/2008 | Ellison et al. | |
| 2012/0015197 | A1 * | 1/2012 | Sun et al. | 428/428 |

FOREIGN PATENT DOCUMENTS

| | | | | |
|---|---|---|---|---|
| CN | 1290665 | A | 4/2001 | |
| CN | 1305965 | A | 8/2001 | |
| CN | 1417145 | A | 5/2003 | |
| CN | 101337770 | A | 1/2009 | |
| CN | 101508524 | A * | 8/2009 | C03C 3/091 |
| CN | 101575167 | A | 11/2009 | |

OTHER PUBLICATIONS

International Search Report from International Application No. PCT/CN2010/002010 dated Mar. 17, 2011.

Chinese Office Action dated May 12, 2014 corresponding to Chinese Patent App. No. 2010800562.X, 20 pp.

* cited by examiner

*Primary Examiner* — Michael B Pallay

(74) *Attorney, Agent, or Firm* — Ohlandt, Greeley, Ruggiero & Perle, LLP

(57) ABSTRACT

An aluminosilicate glass for touch screens is provided. The glass includes, calculated based on weight percentage: $SiO_2$, 55 to 65%; $Na_2O$, 12 to 17%; $Al_2O_3$, 15 to 20%; $K_2O$, 2 to 6%; MgO, 3.9 to 10%; $ZrO_2$, 0 to 5%; ZnO, 0 to 4%; CaO, 0 to 4%; $Na_2O+K_2O+MgO+ZnO+CaO$, 15 to 28%; $SnO_2$, 0 to 1%; $TiO_2+CeO_2$, ≤1%. A chemical strengthening method for glass also provided that includes ion exchange strengthening in a 100% $KNO_3$ salt bath, wherein a preheating temperature ranges from 370° C. to 430° C. and the treatment time is from 0.5 to 16 hours.

26 Claims, No Drawings

ALUMINOSILICATE GLASS FOR TOUCH SCREEN

TECHNICAL FIELD

The present invention relates to an aluminosilicate glass. Specifically, the present invention relates to an aluminosilicate glass having high strength, high fracture toughness, and high scratch resistance. More specifically, the present invention relates to an aluminosilicate glass having high strength, high fracture toughness, and high scratch resistance for use as a screen protective material of electronics. Even more specifically, the present invention relates to an aluminosilicate glass having high strength, high fracture toughness, and high scratch resistance for touch screens. Further, the present invention relates to a chemical strengthening process of an aluminosilicate glass.

BACKGROUND

The issue of screen protection has been more and more brought to the attention of manufacturers and users with growing popularity of electronic display products such as plasma TVs, liquid crystal TVs, liquid crystal displays, ATM machines, cell phones, PDAs, personal amusement gadgets, information searching machines, media advertising players, etc.

In the past, a layer of protective cover plate was normally placed on the surface that mainly comprised organic plate and soda-lime glass. However, these materials do not have sufficient mechanical properties regarding hardness, mechanical strength, surface scratch resistance and impact resistance. Especially for touch screens, such as the touch screens of PDAs and cell phones, damageable and frequent operations such as writing, scratch and impact on touch screens by fingers, electronic pens, roller pens, and even keys could often cause breakage or surface roughness for screens, which influences the lifetime and the display effect of the devices as a whole.

A touch screen is a display that detects and corresponds to touching in display area, causing a direct interaction with the display without keyboards, mouse devices or touch pads. Touch screens, such as resistive touch screens, capacitive touch screens or projective capacitive touch screens, need a glass substrate to deposit transparent conductive oxides for transmitting signals. In particular, an additional glass cover is normally needed for the purpose of protecting the display.

A resistive touch screen transmits touch signals through a flexible surface cover plate, which normally is a plastic or glass plate coated with a transparent conductive oxide (TCO) film. Touching makes the flexible cover plate deform and is conducted to contact the inner conductive substrate, thereby varying the resistance and current of the circuit. This is generally recognized as a touch event for treatment. A flexible surface layer requires higher scratch resistance and transmissivity especially for outdoor applications. Plastics cannot satisfy the requirements, therefore, a sheet of glass having a thickness of about 0.1 to 0.3 mm is necessary.

Particularly, the projective capacitive touch screen represents the rapid developing trend in the market of touch screens as it has the advantages of high transmissivity, high resolution, and long lifetime; and supports for the multi-touch technology. For this type of capacitive touch screens, glass can be used as a substrate of a coated film or a cover plate. The capacitive touch screen responds to finger's touch through the variation of the capacitance of a circuit, and usually only a glass substrate having a two-side TCO coating is required.

A glass as a substrate is coated with the TCO film. A substrate glass is generally a soda-lime glass coated with TCO (transparent transmission coating). Two sheets of glass coated with TCO film layers forms a capacitor through a thin spaced room. What is important is that the top layer glass protects the display from being damaged, and thus high surface scratch resistance and strength are desired.

In addition, other types of touch screens such as surface acoustic wave touch screens, optical touch screens all need glass cover panels or substrates of high transmissivity and high strength.

The substrate and cover plate in the application field of touch screens require that a glass should be subjected to strengthening and/or toughening for further increasing the strength and toughness of the glass. Generally, a glass thickness is supposed to be in the range of 0.3 mm to 1.5 mm when application requires strengthening since the physical tempering is applicable only to a glass having a thickness of greater than 3 mm. Therefore, chemical treatment is necessary for strengthening a glass having a thickness ranging from 0.3 mm to 1.5 mm.

The glass surface strengthening technology includes not only the general air tempering (air jet strengthening) process, but also the chemical tempering technology. The nature of the chemical tempering technology is to change the structure of the glass surface, thus increasing the strength of the glass surface. The chemical tempering can also be named chemical strengthening.

The chemical strengthening is generally divided into 1) alkylating treatment of the glass surface; 2) plating a layer of glassy material having a low expansion coefficient on the glass surface; 3) alkali metal ion exchange. The chemical strengthening mentioned here refers to ion-exchange strengthening. Generally speaking, ion-exchange strengthening is further executed through two processes: high temperature ion exchange and low temperature ion exchange. And the ion-exchange strengthening is also named ion-exchange toughening.

The high temperature ion-exchange strengthening refers to forming an altered layer on the glass surface with a glassy material having a low expansion coefficient above the strain temperature of a glass. A typical high temperature ion-exchange is to heat a glass comprising $Na_2O$ and $K_2O$ to a temperature above the strain temperature, impregnating the glass into molten salt comprising $Li^+$ at a temperature lower than the softening temperature, and heating the glass and the molten salt to a temperature above the strain temperature; the glass has a loose network at this time, and the surface can be altered easily, thereby promoting the ion-exchange between $Na^+$ or $K^+$ and $Li^+$ occurring between the glass and the molten salt. After a period of ion-exchange between $Li^+$ and $Na^+$ or $K^+$ on the glass surface, the glass is taken out for annealing and cooling to room temperature, and then a layer rich in $Li^+$ ions is formed on the glass surface. Since a $Li^+$ layer has an expansion coefficient far lower than that of an ion layer comprising $Na^+$ or $K^+$ (a glass rich in sodium and potassium, and a glass rich in lithium have different expansion coefficients), the contractions on the exterior and in the interior of a glass are different during cooling. Therefore, a residual compressive stress layer is formed on the glass surface, and a tensile stress layer is generated inside the glass. If the glass comprises $Al_2O_3$ and $TiO_2$, a $TiO_2$—$Al_2O_3$-$4SiO_4$ crystal having an even smaller expansion coefficient is formed when ion-exchange taking place, and an extremely large compressive stress will be generated after cooling. However, the high temperature ion-exchange may cause optical distortion easily, and the glass can be deformed easily. And the molten salt has a high temperature during production, generates a large amount of volatiles and pollutes environment. Further, the molten salt is apt to be failure easily.

The low temperature ion-exchange strengthening is widely used, of which the mechanism comprises impregnating the glass into a molten salt of an alkali metal compound wherein the ion has a radius larger than that of the alkali metal ion contained in the glass under a temperature lower than the strain temperature of the glass. Ions having large volumes in the molten salt squeeze into spaces occupied originally by ions of small volumes in the glass network, and ions of small volumes are exchanged into the molten salt. When the glass is cooled, the glass network shrinks. As ions of large volumes need larger spaces, a compressive stress is formed on the glass surface. The surface compressive stress remains inside the glass when cooled, and thus, a compacted compressed layer is formed on the glass surface. Presence of such a compressed layer can reduce fine cracks on the glass surface with a pre-stressed layer forming on the glass surface, whereby the bending resistance and impact resistance of the glass are tremendously increased.

Smaller ions in a glass are exchanged by larger ions in a chemical salt, for example, smaller $Na^+$ ions in a glass is exchanged by larger $K^+$ ion by the commonly known $KNO_3$ salt bath.

For the purpose of promoting an efficient ion-exchange process, at least one smaller alkali ion, in particular $Li^+$ or $Na^+$, is an indispensable component in a glass that allows for being exchanged by larger ions in a salt such as $KNO_3$. Under the conditions of not losing other characters, the amount of the alkali ion should be as high as possible for providing sufficient exchange sites. In addition, $Al_2O_3$ is also an indispensable component for providing a high strength glass material, and what is important, larger networks can be formed as diffusion channels for housing alkali metal ions, which in turn will result in a rapid and effective ion exchange.

The ion exchange process generates a compressive stress of several hundreds MPs on the glass surface, and a tensile stress in the center of the glass correspondingly due to the fact that the surface compressive stress inhibits small defects from spreading and thus an strengthening effect is obtained when an outside load is applied.

Generally, a depth of ion exchange layer (which is called DoL) of several tens of micrometers can be obtained on the glass surface by ion exchange process, which is of highly scratch resistance against outside forces.

In order to satisfy the requirement of application as a cover plate of a touch screen, a rapid and effective strengthening treatment is very important in terms of practical perspective. CN 101337770 A records that treatment is conducted for 3 to 8 hours in a temperature ranging from 430 to 490° C. And CN 101508524 A records that the glass needs to be treated for 8 hours at 420° C. or 5 hours at 500° C. for obtaining a DoL of above 40 micrometers. However, a high salt bath treatment temperature or a long treatment time tends to loose the network of the glass surface rapidly, producing a lower surface compressive stress.

In addition, a "green" glass without harmful substances has become the new trend of electronic products. Formulations of a glass disclosed in US 2008/0286548, U.S. Pat. No. 5,895,768, CN 101575167A, CN 101337770A and CN 101508524A are all involved with $As_2O_3$, $Sb_2O_3$, $Cl_2$ or $F_2$ as an agent for glass refining, which, however, imposes limitations on the possibilities of their wide use in electronic industry.

Moreover, for a touch screen, especially for a touch screen glass used in outdoor public places, there is a possibility of bacterium spreading by fingers, which requires an antibacterial function for a new generation touch screen. According to the report of US 2007/0172661, the above function on the surface of a normal flat glass or a glass ceramics is achieved mainly by a film coating process or an ion-exchange process. Its principle is to introduce silver ions on the glass surface for absorbing and killing bacteria.

SUMMARY OF THE INVENTION

In the prior art, the silicate glass for a touch screen has the following disadvantages:

1. The scratch resistance and transmissivity of the glass are not sufficiently high;

2. The glass having a thickness between 0.3 mm and 1.5 mm does not have sufficient strength and toughness;

3. A high salt bath treatment temperature or a long treatment time may loose the network of the glass surface rapidly, resulting in a lower surface compressive stress;

4. Using of $As_2O_3$, $Sb_2O_3$, $Cl_2$ or $F_2$ as a refining agent for glass refining may bring an adverse impact to the environment;

5. Introducing silver ions on the glass surface for absorbing bacteria requires a complicated process.

The inventors of the present invention have found out, after a long study, that a glass having high strength, hardness, scratch resistance, and Young's modulus can be obtained by using an aluminosilicate glass composition having a novel formulation, subjecting to strengthening treatment under suitable low temperature chemical toughening conditions, for use as a cover plate and a substrate glass of a projective capacitive touch screen as well as a touch screen of other electronic products.

An aluminosilicate glass composition having a novel formulation is used in the current invention, which, after strengthening treatment under a suitable low temperature chemical toughening condition, can provide a glass having a thickness ranging from 0.3 mm to 1.5 mm, particularly a glass having high hardness, Young's modulus and scratch resistance. At the same time, the glass of the present invention can have even higher impact resistance after chemical strengthening. The aluminosilicate glass of the present invention has high strength and high scratch resistance, and is preferably applicable to outdoor applications.

The glass of the present invention is made by floating, and tin dioxide generated in the tin bath can achieve the effect of removing bubbles. Therefore, it is not necessary to use environmentally unfriendly substances as a refining agent.

Therefore, one object of the present invention is to provide an aluminosilicate glass for touch screens, the aluminosilicate glass has high strength and scratch resistance, and can be used as a cover plate or substrate of a touch screen.

Another object of the present invention is to provide a chemical strengthening method for an aluminosilicate glass for use as a touch screen. The method can be used to strengthen the glass for a touch screen effectively at a lower temperature for a shorter period of time.

Moreover, the object of the present invention is to provide a glass that has a surface antibacterial function for use as a cover plate of a touch screen.

More specifically, the present application is directed to the following inventions.

The present invention provides an aluminosilicate glass, which is characterized in that the glass consists of the following components, calculated based upon weight percentage (wt %):

| | |
|---|---|
| $SiO_2$ | 55 to 65 |
| $Na_2O$ | 12< to 17 |
| $Al_2O_3$ | 15< to 20 |
| $K_2O$ | 2 to 6 |
| MgO | 3.9 to 10 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

In the present invention, the content of each of the components is based on the total weight of the glass components (hereinafter the same).

In one embodiment, the amount of $SiO_2$ is from 58 to 63 wt %.

In one embodiment, the amount of $Na_2O$ is from 12< to 15 wt %.

In one embodiment, the amount of $K_2O$ is from 3 to 5 wt %.

In one embodiment, the amount of $Al_2O_3$ is from 15< to 18 wt %.

In one embodiment, the amount of $Al_2O_3$ is from 15< to 17 wt %.

In one embodiment, the amount of MgO is from 3.9 to 8.0 wt %.

In one embodiment, the amount of MgO is from 3.9 to 6.0 wt %.

In one embodiment, the amounts of ZnO and CaO are each lower than 2 wt %.

In one embodiment, the amount of $ZrO_2$ is from 0.1 to 3 wt %.

In one embodiment, the amount of $ZrO_2$ is from 0.1 to 2 wt %.

In one embodiment, the sum of the amounts of components $Na_2O+K_2O+MgO+ZnO+CaO$ is from 15 to 25 wt %.

The present invention also provides a method for glass strengthening, which comprises providing the aluminosilicate glass of the present invention, and ion-exchange strengthening in a 100% $KNO_3$ salt bath, wherein the preheating temperature ranges from 370° C. to 430° C., and the period of time for treatment is from 0.5 to 16 hours.

In one embodiment, the temperature ranges from 370° C. to 420° C., and the treatment time ranges from 0.5 to 8 hours.

In one embodiment, the temperature ranges from 380° C. to 420° C., and the treatment time ranges from 0.5 to 4 hours.

In one embodiment, the temperature ranges from 390° C. to 410° C., and the treatment time ranges from 1 to 3 hours.

In one embodiment, after ion-exchange, the aluminosilicate glass has a compressive stress of 600 to 1,000 MPa.

In one embodiment, after ion-exchange, the aluminosilicate glass has a DoL of 10 to 80 μm.

In one embodiment, after ion-exchange, the aluminosilicate glass has a DoL of 10 to 40 μm.

In one embodiment, after ion-exchange, the aluminosilicate glass has a DoL of 10 to 30 μm.

In one embodiment, after ion-exchange, the aluminosilicate glass has a DoL of 10 to 20 μm.

In one embodiment, after ion-exchange, the aluminosilicate glass having a thickness of 0.3 mm has a breakage height of ball drop strength test of 200 to 400 mm and a ring-on-ring breakage force of 400 to 1,000 N.

In one embodiment, after ion-exchange, the aluminosilicate glass having a thickness of 0.5 mm has a breakage height of ball drop strength test of 300 to 500 mm and a ring-on-ring breakage force of 500 to 1,200 N.

In one embodiment, after ion-exchange, the aluminosilicate glass having a thickness of 0.7 mm has a breakage height of ball drop strength test of 400 to 1,000 mm and a ring-on-ring breakage force of 1,000 to 4,000 N.

In one embodiment, after ion-exchange, the central tension is lower than 60 MPa.

In one embodiment, after ion-exchange, the central tension is lower than 30 MPa.

The present invention further provides an aluminosilicate glass plate, which is characterized in that the glass plate consists of the following components, calculated based upon weight percentage (wt %):

| | |
|---|---|
| $SiO_2$ | 55 to 65 |
| $Na_2O$ | 12< to 17 |
| $Al_2O_3$ | 15< to 20 |
| $K_2O$ | 2 to 6 |
| MgO | 3.9 to 10 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

In one embodiment, the amount of $SiO_2$ is from 58 to 63 wt %.

In one embodiment, the amount of $Na_2O$ is from 12< to 15 wt %.

In one embodiment, the amount of $K_2O$ is from 3 to 5 wt %.

In one embodiment, the amount of $Al_2O_3$ is from 15< to 18 wt %.

In one embodiment, the amount of $Al_2O_3$ is from 15< to 17 wt %.

In one embodiment, the amount of MgO is from 3.9 to 8.0 wt %.

In one embodiment, the amount of MgO is from 3.9 to 6.0 wt %.

In one embodiment, the amounts of ZnO and CaO are each lower than 2 wt %.

In one embodiment, the amount of $ZrO_2$ is from 0.1 to 3 wt %.

In one embodiment, the amount of $ZrO_2$ is from 0.1 to 2 wt %.

In one embodiment, the sum of the amounts of components $Na_2O+K_2O+MgO+ZnO+CaO$ is from 15 to 25 wt %.

The present invention also provides a method for glass strengthening, which comprises providing the aluminosilicate glass plate of the present invention, and ion-exchange strengthening in a 100% $KNO_3$ salt bath, wherein the preheating temperature ranges from 370° C. to 430° C., and the period of time for treatment is from 0.5 to 16 hours.

In one embodiment, the temperature ranges from 370° C. to 420° C., and the treatment time ranges from 0.5 to 8 hours.

In one embodiment, the temperature ranges from 380° C. to 420° C., and the treatment time ranges from 0.5 to 4 hours.

In one embodiment, the temperature ranges from 380° C. to 410° C., and the treatment time ranges from 1 to 3 hours.

In one embodiment, after ion-exchange, the aluminosilicate glass plate has a compressive stress of 600 to 1,000 MPa.

In one embodiment, after ion-exchange, the aluminosilicate glass plate has a DoL of 10 to 80 μm.

In one embodiment, after ion-exchange, the aluminosilicate glass plate has a DoL of 10 to 40 μm.

In one embodiment, after ion-exchange, the aluminosilicate glass plate has a DoL of 10 to 30 μm.

In one embodiment, after ion-exchange, the aluminosilicate glass plate has a DoL of 10 to 20 μm.

In one embodiment, after ion-exchange, the aluminosilicate glass plate having a thickness of 0.3 mm has a breakage height of ball drop strength test of 200 to 400 mm and a ring-on-ring breakage force of 400 to 1,000 N.

In one embodiment, after ion-exchange, the aluminosilicate glass plate having a thickness of 0.5 mm has a breakage height of ball drop strength test of 300 to 500 mm and a ring-on-ring breakage force of 500 to 1,200 N.

In one embodiment, after ion-exchange, the aluminosilicate glass plate having a thickness of 0.7 mm has a breakage height of ball drop strength test of 400 to 1,000 mm and a ring-on-ring breakage force of 1,000 to 4,000 N.

In one embodiment, after ion-exchange, the central tension is lower than 60 MPa.

In one embodiment, after ion-exchange, the central tension is lower than 30 MPa.

The aluminosilicate glass or aluminosilicate glass plate of the present invention is made by floating.

In one embodiment, the aluminosilicate glass or plate made by floating has a thickness of 0.5 mm to 20 mm.

The aluminosilicate glass or aluminosilicate glass plate of the present invention is made by down-draw process.

In one embodiment, for the aluminosilicate glass or plate made by down-draw process, a refining agent selected from arsenic trioxide, antimony trioxide, sulfate, nitrate, fluoride or chloride is used.

In one embodiment, the aluminosilicate glass or plate made by down-draw process has a thickness of 0.1 to 1.5 mm.

The aluminosilicate glass or the aluminosilicate glass plate of the present invention is used as a touch screen.

The touch screen of the aluminosilicate glass of the present invention is for a mobile electronic device.

The present invention also provides a mobile electronic device, wherein the mobile electronic device comprises an aluminosilicate glass cover plate, the aluminosilicate glass cover plate consists of the following components, calculated based upon weight percentage (wt %):

| | |
|---|---|
| $SiO_2$ | 55 to 65 |
| $Na_2O$ | 12< to 17 |
| $Al_2O_3$ | 15< to 20 |
| $K_2O$ | 2 to 6 |
| MgO | 3.9 to 10 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

The present invention further provides a method for production of an antibacterial and tempered aluminosilicate glass plate, which comprises providing the aluminosilicate glass plate of the present invention and adding silver nitrate into a molten nitrate during chemical strengthening.

In one embodiment, silver nitrate is added to the $KNO_3$ salt bath at a weight percentage of 0.1 to 15%, based on the total weight of the molten salt.

In one embodiment, silver nitrate is added to the $KNO_3$ salt bath at a weight percentage of 0.1 to 10%, based on the total weight of the molten salt.

In one embodiment, silver nitrate is added to the $KNO_3$ salt bath at a weight percentage of 0.1 to 5%, based on the total weight of the molten salt.

The present invention further provides an antibacterial and tempered aluminosilicate glass for use as a touch screen, which is characterized in that the glass consists of the following components, calculated based upon weight percentage (wt %):

| | |
|---|---|
| $SiO_2$ | 55 to 65 |
| $Na_2O$ | 12< to 17 |
| $Al_2O_3$ | 15< to 20 |
| $K_2O$ | 2 to 6 |
| MgO | 3.9 to 10 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

Said glass is further characterized in that adding silver nitrate into a molten nitrate during chemical strengthening of the glass, the glass has at least one of the following properties after ion-exchange:

a DoL of 10 to 80 μm;

a central tension lower than 60 MPa;

a compressive stress from 600 to 1,000 MPa;

a glass having a thickness of 0.3 mm has a breakage height of ball drop strength test 200 to 400 mm and a ring-on-ring breakage force of 400 to 1,000 N;

a glass having a thickness of 0.5 mm has a breakage height of ball drop strength test of 300 to 500 mm and a ring-on-ring breakage force of 500 to 1,200 N;

a glass having a thickness of 0.7 mm has a breakage height of ball drop strength test of 400 to 1,000 mm and a ring-on-ring breakage force of 1,000 to 4,000 N; and an antibacterial function.

In one embodiment, the ion-exchange strengthening is conducted in a 100% $KNO_3$ salt bath, wherein the preheating temperature ranges from 370° C. to 430° C., and the period of time for treatment is from 0.5 to 16 hours.

In one embodiment, the ion-exchange strengthening is conducted in a 100% $KNO_3$ salt bath, wherein the preheating temperature ranges from 370° C. to 420° C., and the treatment lasts from 0.5 to 8 hours.

In one embodiment, the ion-exchange strengthening is conducted in a 100% $KNO_3$ salt bath, wherein the preheating temperature ranges from 380° C. to 420° C., and the treatment lasts from 0.5 to 4 hours.

In one embodiment, the ion-exchange strengthening is conducted in a 100% $KNO_3$ salt bath, wherein the preheating temperature ranges from 390° C. to 410° C., and the treatment lasts from 1 to 3 hours.

In one embodiment, silver nitrate is added to a $KNO_3$ salt bath at a weight percentage of 0.1 to 15%, based on the total weight of the molten salt.

In one embodiment, silver nitrate is added to a $KNO_3$ salt bath at a weight percentage of 0.1 to 10%, based on the total weight of the molten salt.

In one embodiment, silver nitrate is added to a $KNO_3$ salt bath at a weight percentage of 0.1 to 5%, based on the total weight of the molten salt.

The preferable aluminosilicate glass of the present invention is characterized in that the glass consists of the following components, calculated based upon weight percentage (wt %):

| | |
|---|---|
| $SiO_2$ | 56 to 64 |
| $Na_2O$ | 12.1 to 16.5 |

-continued

| | |
|---|---|
| $Al_2O_3$ | 15.1 to 19.0 |
| $K_2O$ | 2.5 to 5.5 |
| MgO | 3.9 to 9.0 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

Another preferable aluminosilicate glass of the present invention is characterized in that the glass consists of the following components, calculated based upon weight percentage (wt %):

| | |
|---|---|
| $SiO_2$ | 57 to 63 |
| $Na_2O$ | 12.1 to 16.0 |
| $Al_2O_3$ | 15.1 to 18.5 |
| $K_2O$ | 2.8 to 5.0 |
| MgO | 4.0 to 9.0 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | ≤1 |

The present invention provides a method for production of an antibacterial and tempered aluminosilicate glass cover plate, i.e., during chemical strengthening of the glass, silver nitrate is added into a molten nitrate. Silver ions can permeate into the glass surface during ion-exchange to achieve the antibacterial effect.

The glass of the present invention can also be used in other applications, such as, for the cover plate of electronic devices such as lap-top computers, mobile phones and the like for protecting the inside electronic components; for the cover plate glass of photoelectric (device) plates; for the substrate of hard disks; and for the deposit substrate or the protective cover plate of film solar cells. These cover plates and substrates require high strength and high scratch resistance during long term usage.

DETAILED DESCRIPTION OF THE INVENTION $SiO_2$ is a main component of a glass for forming the network. If the amount of $SiO_2$ is lower than 55 wt %, the formability and chemical resistance of the glass will be decreased, and the glass will have a larger trend to crystallize. If the amount is higher than 65 wt %, the glass will have a higher viscosity and melt point, which is not suitable for floating process. For the purpose of maintaining a good formability and a proper melting and forming temperature, the amount of $SiO_2$ is preferably in the range of 58 to 63 wt %.

Addition of alkali oxides such as $Na_2O$ and $K_2O$ to a glass may lower the melting temperature. Particularly, for satisfying an effective ion-exchange strengthening, a higher amount of $Na_2O$ is needed for the exchange of $K^+ \leftarrow\rightarrow Na^+$. The more ions exchange between a glass and a salt ($KNO_3$), the higher strength a glass has. However, an excessive amount of alkali may increase the thermal expansion coefficient, thus decreasing the heat resistance and formability of the glass. Therefore, the amount of the component $Na_2O$ is limited to the range of 12< to 17 wt %, and more preferably, to the range of 12< to 15 wt %. The amount of $K_2O$ is maintained low, e.g., 6 wt %, to avoid an adverse impact on the ion exchange process. The amount of $K_2O$ is preferably from 3 to 5 wt %.

For providing a glass material having high strength and hardness, $Al_2O_3$ is an indispensable component. In addition, the glass also has high scratch resistance during treatment. In order to obtain a rapid diffusion, it is expected that a high amount of $Al_2O_3$ in the glass will facilitate the ion exchange process of $Na^+ \leftarrow\rightarrow K^+$, since $Al_3^+$ tends to form network $[AlO_4]$ that is much larger than a regular $[SiO_4]$ network, and then larger pores are left as diffusion channels of ions, which makes a contribution to completion of the ion exchange process in a short period of time, such as within 0.5 hours to 8 hours at a low temperature, such as 370 to 430° C. However, an amount of greater than 20 wt % of $Al_2O_3$ increases the trend towards crystallization and the viscosity of the glass, and therefore, should be avoided. The present invention has an amount of $Al_2O_3$ generally from 15< to 20 wt %, preferably from 15< to 18 wt %, and most preferably from 15< to 17 wt %.

MgO is also an indispensable component. An amount of less than 10 wt % of MgO helps decrease melting point, enhance homogeneity, increase anti-hydrolysis and accelerate ion exchange. The amount of MgO is in the range of 3.9 to 10.0 wt %, preferably in the range of 3.9 to 8.0 wt %, and most preferably in the range of 3.9 to 6.0 wt %.

ZnO and CaO have similar functions, but excessive addition will increase the trend towards crystallization. In the present invention, the amounts of ZnO and CaO are limited to lower than 4 wt %, and preferably each lower than 2 wt %.

$ZrO_2$ is added as the component for further improving the Young's modulus and the chemical resistance of the glass, and enhancing the ion exchange. However, $ZrO_2$ is also the component that can increase the trend towards crystallization and the melting temperature. Therefore, the amount of $ZrO_2$ is less than 5 wt %, preferably from 0.1 to 3 wt %, and most preferably from 0.1 to 2 wt %.

The components ($Na_2O+K_2O+MgO+ZnO+CaO$) are required to be further limited, further narrowing down the preferable compositional range. The sum of components ($Na_2O+K_2O+MgO+ZnO+CaO$) should be within the range of 15 to 28 wt % for maintaining good meltability and formability of the galss. In the present invention, the sum of components ($Na_2O+K_2O+MgO+ZnO+CaO$) is most preferably from 15 to 25 wt %.

In particular cases, addition of $TiO_2$ and $CeO_2$ can improve the meltability of the glass. However, the total amount thereof is less than 1 wt %.

The glass of the present invention is free of $B_2O_3$. Addition of $B_2O_3$ may improve the meltability of the glass and lower the melting point of the glass. However, a big disadvantage of addition of $B_2O_3$ is the negative impact on chemical strengthening of ion-exchange, i.e., lowering the ion-exchange speed and failing to have a high surface compressive stress, which is due to the fact that boron oxide forms the dense $[BO_4]$ network, which limits the migration of ions in the glass.

In addition, the glass components in the present invention do not comprise any environmentally unfriendly heavy metal elements, such as BaO, PbO, etc.

$SnO_2$ is formed on the tin bath during floating by which the glass of the present invention is made. During melting, it is completely no necessary to add harmful additives such as $As_2O_3$, $Sb_2O_3$, sulfate, nitrate for the refining process of the glass, thus producing the "green" glass without containing harmful components. It is the nature of the production process per se that the glass surface may contain no more than 1.0 wt % of $SnO_2$, which, nevertheless, does not affect the property of the glass.

To a person skilled in the art, modification, even a small modification of the compositions of a float glass is generally intractable due to huge investment in such kind of device. If the components of the glass cause to accelerate the damage of refractory materials, the repairing of the device is very expensive in practical production.

Float production of a glass is a known process. After being taken out of the furnace, the glass melt passes through a bath containing liquid tin, the glass floats on the liquid tin, and the glass viscosity is increased during transferring forwardly. Such a process achieves the purpose of shaping a glass having a clean surface.

Other methods for preparing a flat glass, such as the down-draw process, are also suitable for production of the glass of the present invention. In the circumstances, commonly used refining agents including arsenic trioxide, antimony trioxide, sulfate, nitrate, fluoride, chloride, etc. can be used.

The down-draw process for production of a glass is also a known process for glass processing. After being taken out of the furnace, the glass passes through a bath. The glass having a lower viscosity overflows downwardly through a narrow slot at the lower part of the bath, and thus the glass is shaped and has a smooth surface.

The benefits of the float process are to produce a large-sized glass with a wider thickness range at comparatively lower costs. The thickness of the glass of the present invention ranges from 0.5 mm to 20 mm. The glass made by the down-draw process generally has a thickness ranging from 0.1 mm to 1.5 mm.

A 100% $KNO_3$ salt bath is used for ion-exchange strengthening. A stainless steel frame is designed to deliver the glass, and the glass is then placed into the salt bath after a preheating step. The preheating is normally conducted at a temperature ranging from 370° C. to 430° C., preferably from 370° C. to 420° C., more preferably from 380° C. to 420° C., and most preferably from 390° C. to 410° C. The treatment time is from 0.5 to 16 hours, preferably from 0.5 to 8 hours, more preferably from 0.5 to 4 hours, and most preferably from 1 to 3 hours.

Chemical strengthening is to exchange smaller ions (normally $Na^+$) with larger ions (normally $K^+$), thereby forming compressive stress on the glass surface with the result of strengthening fracture toughness and strength reliability of a glass. Similarly, a glass containing $Li^+$ ions can be strengthened through a salt containing $Na^+$, such as $NaNO_3$. Therefore, alkali metal ions should be present in a glass as they have the highest diffusibility.

$KNO_3$ is the most preferable compound for glass strengthening for a salt bath. Alternatively, various catalysts can be used together with $KNO_3$ to promote the exchanging speed of ions or improve properties of the strengthened glass. Examples of the catalysts are $K_2SO_4$, $K_2SiO_4$, KOH, $Al_2O_3$, $Al(OH)_3$, etc.

Temperature and time are the most important factors affecting a strengthening process. $KNO_3$ starts to melt at about 337° C. and decompose at about 400° C. The temperature range of 360° C. to 500° C. is widely employed for chemical strengthening of a glass. However, the problem brought by low temperatures is failure to achieve a rapid ion-exchange speed, while higher temperatures could loosen the network on the glass surface rapidly and high compressive stress could not be obtained. Similarly, a shorter period of time for treatment could render ion penetration insufficient, while an excessively long period of time for treatment could loosen the network of a glass, resulting in failure to achieve the desired effects. For ideal properties, suitable temperatures and treatment periods of time are required to reach the optimized strength and stress state.

The surface scratch and edge quality greatly affect the strength of a glass in spite of a strengthened or an unstrengthened glass. The glass strength decreases gradually with the scratch depth increasing. Therefore, surface scratching should be avoided during treatment and processing of a glass. And sometimes the glass needs to be polished prior to ion exchange. In the present invention, the glass has a comparatively higher hardness, and thus, has a better scratch resistance, which would avoid a high yield loss during treatment, and without a very deep surface polishing.

The surface compressive stress (CS), the depth of the compressive stress (DoL) and the central tensile stress (TS) are properties to determine the properties of the strengthened glass, such as the strength and scratch resistance. A glass having a higher surface compressive stress has a higher strength, and a glass having a deeper DoL has a higher scratch resistance. Under a fixed surface tension, a glass having an even higher DoL will have a higher central tension, instead, which will yield possibilities of the glass being broken easily.

In order to obtain proper strengthening properties, it is very important to design the profile of stress depending on temperature, time and thickness of the glass. Treated at a temperature ranging from 370° C. to 430° C. for 0.5 to 16 hours, the glass of the present invention can have a compressive stress not lower than 600 MPa, normally from 600 to 1,000 MPa, and a DoL not lower than 10 μm. Normally, the DoL ranges from 10 to 80 μm, preferably from 10 to 40 μm, more preferably 10 to 30 μm, and the most preferably 10 to 20 μm. Preferably the treatment lasts 0.5 to 8 hours at a temperature ranging from 370° C. to 430° C. only generates very limited surface looseness. More preferably the treatment is performed at a temperature ranging from 380° C. to 420° C. for 0.5 to 4 hours, and the most preferably at a temperature ranging from 390° C. to 410° C. for 1 to 3 hours. Under an optimized surface stress with a particular DoL and a particular central tensile stress, a thin glass having a thickness of 0.5 mm or even 0.3 mm can also become toughened and have a remarkably increase in breakage strength.

Conventional measurement of strength, i.e., ball drop impact test and ring on ring strength test, can be used to test the improvement of the glass of the present invention in terms of strength and reliability after ion-exchange.

The ball drop strength test is conducted according to the following steps: a ball of steel having a weight of 132 g with a diameter of 31.75 mm is falling from a known height to impact a glass sample sized 50×50×0.7 mm. The impact test starts from a height of 200 mm. The next test starts at a height 50 mm higher than the last one till the glass sample is crushed.

The ring on ring test is conducted according to the following steps: a common universal strength tester is used to apply pressure. The part for applying force is a rigid pressure head having an annular end with a diameter of 4 mm. A member on which the glass is placed is another rigid and annular support ring having a diameter of 20 mm. The glass sample is placed thereon, a force is applied gradually by the universal strength tester, while the pressure head at the upper part generates a displacement towards the glass sample. The force required to crush the sample is recorded by the strength tester at the time when the glass is crushed.

The ball drop strength test can be used to assess the impact strength of the strengthened glass. On average, a glass sized 50×50×0.7 mm strengthened by the standard process that ion-exchange is conducted for 0.5 to 8 hours at a temperature ranging from 370° C. to 430° C. can pass the impact test of a ball of steel having a weight of 132 g with a diameter of 31.75 mm from a height of 300 mm. By adjusting ion-exchange parameters, for a preferred case, the strengthened glass can even pass the impact test of a ball of steel having a weight of 132 g from a height of 800 mm. For the most preferred case, the glass can withstand the impact of a ball of steel from a height of even 1,000 mm. The glass having a thickness of 1.0 mm, 0.5 mm, or even 0.3 mm may obtain the same magnitude of increase in strength after strengthening. Surprisingly, a glass having a thickness of 0.5 mm can pass the impact test of a ball of steel falling from a height of 500 mm, and a glass having a thickness of 0.3 mm can pass the impact test of a ball of steel falling from a height of 400 mm when the glass is made by an optimized process and treated under the conditions of temperature and time within said ranges.

When force is applied gradually by a universal strength tester, the ring on ring test proves that the breakage strength of the glass is increased significantly. For a glass having a given thickness of 0.7 mm, it has a ring-on-ring breakage force of 500 to 800 Newton before strengthening. After strengthening, the breakage force can amount to 1,000 to 4,000 N. After strengthening, the lowest breakage force of 1,000 N can be obtained, more preferably, the strength is greater than 2,000 N, and most preferably, the breakage force can be above 4,000 N, which means that after strengthening, the strength can be increased by a factor of more than 5. For a glass having a thickness of 1.0 mm, 0.5 mm, and even 0.3 mm, it can have the same magnitude of increase in strength after strengthening. Also surprisingly, a glass of 0.5 mm can have a breakage force of up to 1,200 N, and a glass of 0.3 mm can have a breakage force of up to 1,000 N after strengthening through an optimized process within suitable ranges of temperature and time.

Glass is a material sensitive to defects, which often leads to the results of nonuniformity for the test of glass strength. The nonuniformity can be reduced dramatically due to strengthening of the glass by introducing a layer having compressive stress, and allow the glass to withstand the scratch by outside force. However, a large DoL may run the risk of producing an excessive large tensile stress inside the glass, making the glass broken easily. More detailed testing shows that, for the application of the glass of the present invention, the glass is treated for 0.5 to 16 hours in a temperature range of 370° C. to 430° C., and most preferably it is sufficient for the glass to be treated for 1 to 3 hours in a temperature range of 390° C. to 410° C. With such ranges of temperature and time, the glass of the present invention can have a DoL of at least 5 micrometers, and 80 micrometers at most. A longer treatment time will increase the DoL of the exchange layer but decrease the surface stress, which results in a lower stress. Particularly, for a thinner glass, it will take the risk of increasing the internal tensile stress, and in turn breaking the glass easily.

The Antibacterial Function

The present invention provides a touch screen glass having antibacterial function, and a method for achieving the antibacterial function. The antibacterial function can be achieved with chemical strengthening. The specific embodiment includes adding a certain proportion of silver nitrate to potassium nitrate molten salt during chemical strengthening, and the weight percentage is 0.1 to 15% based upon the molten salt, preferably 0.1 to 10%, and most preferably 0.1 to 5%. For the glass made by the method, silver ions from the molten salt will penetrate into a certain depth of the glass through ion-exchange ($Ag^+$ to $Na^+$), the thickness is 0 to 20 micrometers, and preferably 0 to 10 micrometers. The presence of silver ions may enhance the antibacterial function of the surface of a touch screen.

According to the information disclosed in U.S. 2007/0172661, a silver film having antibacterial function can be obtained through a chemical precursor containing silver ions or by ion-exchange under a certain temperature, and the silver ions can enter to a certain depth of the glass. The advantage of the present invention is in that the chemical strengthening and antibacterial function can be accomplished in one step through ion-exchange, which has been successfully applied to the glass penal for touch screens of the present invention.

The ion-exchange treatment is conducted within a temperature range of 370° C. to 430° C., preferably 370° C. to 420° C., more preferably 380° C. to 420° C., and most preferably 390° C. to 410° C. The period of time for ion-exchange is 0.5 to 16 hours, preferably 0.5 to 8 hours, more preferably 0.5 to 4 hours, and most preferably 1 to 3 hours.

Under the above ion-exchange conditions, silver ions can enter to a depth of at least 5 micrometers of the glass. For achieving an effective antibacterial function, the concentration of silver ions amounts to at least 0.1 wt % in a depth range of 2 μm of the glass, preferably at least 0.5 wt %, even more preferably at least 1.0 wt %, and most preferably above 2.0 wt %.

Normally, the permeation of Ag ions will affect the transmissivity of glass. The variation of the transmissivity will be no more than 5% before and after ion-exchange upon comparison, preferably no more than 3%, more preferably no more than 2%, and most preferably lower than 1% while the antibacterial function is maintained at the same time.

EXAMPLES

Table 1 shows the chemical strengthening examples of the glass of the present invention.

Example 1

First, the corresponding materials according to the compositions given in Example 1 are formulated, the materials are melted in a platinum crucible at a temperature of 1600° C. to 1630° C., holding at that temperature for 5 to 15 hours; refining at a temperature of 1640° C. to 1660° C., and then cooling to a temperature of about 1600° C. The platinum crucible is taken out of the high temperature furnace; the glass melt is poured into a cold stainless steel mold to prepare a glass gob sized 65×65×45 mm. Then the glass together with the stainless steel mold is placed into an annealing oven at a temperature of about 600° C. for 2 to 8 hours.

After annealing, the glass is subjected to polishing, and then cutting, edging, and fine polishing to form the sample of desired size, i.e., 50×50×0.7 mm. After polishing, the surface roughness is below 1 nanometer. There are at least 40 sheets of samples.

At least 20 sheets of samples are subjected to chemical strengthening. Strengthening is conducted in a lab scale salt bath furnace (having a diameter of 250×250 mm, and a depth of 400 mm). The samples are placed on a special anticorrosion stainless steel sample shelf. After a 2-hour ion-exchange at a temperature of 390° C., the drop ball test and the ring on ring test are conducted on 20 pieces of the glass subjected to chemical strengthening and 20 pieces of the glass untreated, respectively.

Most of the glass sheets unstrengthened fail to pass the test of an initial impact of a ball of steel weighing 132 g from a height of 200 mm, with only a few being broken when the height is 250 mm. On average, samples not subjected to strengthening are capable of withstanding the impact from a height of ball drop of about 200 mm, and the average breakage force obtained from the ring on ring test is 550N.

Under the same strength test conditions, an unexpected test result is obtained for the tempered glass samples. The average breakage height of a dropping ball weighing 132 g is as high as 788 mm, increased by a factor of about 4 as compared with those unstrengthened. And the average ring-on-ring breakage force is 1820 N, increased by a factor of about 3.3 as compared to those unstrengthened. Under two testing conditions, the strength has been achieved for all the best samples that is four times higher than that of those unstrengthened.

At the same time, tests of surface compressive stress and ion exchange depth are performed on the treated samples. In the case of treatment at a temperature of 390° C. for 2 hours, an average surface compressive stress of 820 MPa and a DoL of 20 micrometers is obtained for the glass in Example 1.

FSM 6000 is used to measure the surface compressive stress and DoL.

The thermal expansion coefficient (CTE) of the obtained glass sample is measured. In a temperature range of 20° C. to 300° C., the multicomponent glass has a linear expansion coefficient of $8.7\times10^{-6}$/° C.

The glass transition point ($T_g$) of the obtained glass is measured. The multicomponent glass has a glass transition point of about 590° C.

The thermal expansion coefficient and the transition point are measured in accordance with the following methods: i.e., measured by use of a dilatometer. The sample is processed as a cylinder having a diameter of 5 mm. The change in length from 20° C. to 300° C. is recorded for calculating the linear expansion coefficient. Around the glass transition point, the linear expansion coefficient of the glass has a obvious sudden change, thus the transition point of the glass can be obtained by extrapolation.

The density of the glass is measured by Archimedes law. The glass sample is placed into a container with water, change in volume of water is measured carefully and thus, the volume of the sample is obtained. The weight of the sample that can be measured accurately divided by the volume gives the data of density.

Example 2

The corresponding materials according to the compositions given in Example 2 are formulated, the materials are melted in a platinum crucible at a temperature of 1600° C. to 1630° C., holding at that temperature for 5 to 15 hours; refining at a temperature of 1640° C. to 1660° C., and then cooling to a temperature of about 1600° C. The platinum crucible is taken out of the high temperature furnace, the glass melt is poured into a cold stainless steel mold to prepare a glass gob sized 65×65×45 mm. Then the glass together with the stainless steel mold is placed into an annealing oven at a temperature of about 600° C. for 2 to 8 hours.

After annealing, the glass is subjected to polishing, and then cutting, edging, and fine polishing to form the sample of desired size, i.e., 50×50×0.7 mm. After polishing, the surface roughness is below 1 nanometer. There are at least 40 sheets of samples.

The chemical strengthening is conducted at a temperature of 420° C. for 3 hours according to the same steps as described in Example 1, and ball drop test, ring on ring test, surface compressive stress, DoL, thermal expansion coefficient, glass transition point and density are all measured as Example 1.

Most of the glass sheets unstrengthened fail to pass the test of an initial impact of a ball of steel weighing 132 g from a height of 200 mm, with only a few being broken when the height is 250 mm. On average, samples not subjected to strengthening are capable of withstanding the impact from a height of ball drop of about 200 mm, and the average breakage force obtained from the ring on ring test is 830N.

Under the same strength test conditions, an unexpected test result is obtained for the tempered glass samples. The average breakage height of a dropping ball weighing 132 g is as high as 650 mm, increased by a factor of more than 3 as compared with those unstrengthened. And the average ring-on-ring breakage force is 1724 N, increased by a factor of more than 2 as compared to those unstrengthened. Under two testing conditions, the strength has been achieved for all the best samples that is three times higher than that of those unstrengthened.

At the same time, tests of surface compressive stress and ion exchange depth are performed on the treated samples. In the case of treatment at a temperature of 430° C. for 2 hours, an average surface compressive stress of 800 MPa and a DoL of 35 micrometers is obtained for the glass in Example 2.

The thermal expansion coefficient (CTE) of the obtained glass sample is measured. In a temperature range of 20° C. to 300° C., the multicomponent glass has a linear expansion coefficient of $8.6\times10^{-6}$/° C.

The glass transition point ($T_g$) of the obtained glass is measured. The multicomponent glass has a glass transition point of about 605° C.

Example 3

In Example 3, the glass having the same composition but different thickness (0.7 mm, 0.5 mm, 0.3 mm) is subjected to strengthening under the same conditions, and each of the tests in the above Example 1 and 2 are conducted. The results show that even for a thinner glass, i.e., the thickness of 0.5 mm and 0.3 mm, the chemical strengthening performed for a shorter period of time is sufficient to bring about an effective strengthening effect, satisfying applications in related fields.

Comparative Examples

The comparative examples are listed in Table 2.

Glass 1 is a common soda-lime glass having the major components of silica, sodium oxide, calcium oxide; Glass 2 is a borosilicate glass having the major components of silica, boron oxide, sodium oxide; and Glass 3 is another aluminosilicate glass having the major components of silica, sodium oxide and aluminum oxide.

Comparing with Examples in the present invention, under the same conditions of chemical strengthening ($KNO_3$, 390° C., 2 h), the surface compressive stress obtained in comparative examples are all less than those obtained in Examples of the present invention where the components of the glass fall within the component ranges as claimed. In addition, the comparative examples have disadvantages that the ion-exchange speed is less than that obtained in the Examples, i.e., the temperature or the period of time for ion-exchange in the comparative examples should be increased to obtain a DoL of 20 micrometers.

Examples of Antibacterial Experiment

Table 3 shows the examples of antibacterial experiment.

The glass samples in examples 1 to 3 are used and 4% by weight of silver nitrate is added to molten salt to prepare the antibacterial glass. The ion exchange is conducted at a temperature of 390° C. for 2 hours. And the antibacterial performance, content of silver ions of the surface layer, variation of transmissivity and strength of this batch of glass are measured.

The corresponding antibacterial test is conducted according to the method stipulated in the international standard ASTM 2180-01, the bacteria to be detected include: *Pseudomonas aeruginosa, Staphyloccocus aureus, Aspergillus niger, Monilia albican, Escherichia coli, Salmonella.*

The corresponding antibacterial test is conducted according to the method stipulated in the National Construction Industry Standard JCT 1054-2007, Standard of Coated Antibacterial Glass, the bacteria to be detected include: *Escherichia coli, Staphyloccocus aureus.*

If the number of bacteria detected in line with the above two methods is reduced by over two orders of magnitude, it is considered that the antibacterial index has been achieved for the embodiments of the present invention.

The glass in antibacterial examples 1 to 3 is subjected to the test described in ASTM 2180-01. Results show that the glass obtained by the process can pass the corresponding test and has excellent antibacterial function.

The scanning electron microscope and the energy spectrum analysis are used to measure the weight percentage of silver ions within a depth of 2 micrometers in the surface layer of glass, and the weight percentage of silver ions is about 1%.

A spectrograph LAMDA 750 is used to measure the transmissivity variation of the glass before and after ion-exchange at a wavelength of 550 nm. The glass sample has a thickness of 0.7 mm. Before strengthening, the transmissivity is 92% at 550 nm, and after ion-exchange, the transmissivity is reduced only about 1%, i.e., the transmissivity is 91% at 550 nm.

The results of ring on ring strength test and ball drop test demonstrate that addition of silver ions does not exert any effect on chemical strengthening, and as such the strength of the glass is not reduced at all.

TABLE 1

Examples of glass compositions and properties, and parameters for chemical strengthening

| | Ex 1 | Ex 2 | | Ex 3 | | Ex 4 | Ex 5 | Ex 6 | Ex 7 | Ex 8 | Ex 9 | Ex 10 |
|---|---|---|---|---|---|---|---|---|---|---|---|---|
| $SiO_2$ (wt %) | 63 | 61.7 | | 60.7 | | 60.7 | 61 | 61 | 59.6 | 58 | 57.5 | 58.3 |
| $Na_2O$ (wt %) | 13 | 12.2 | | 12.6 | | 13 | 13.2 | 12 | 15.2 | 15.2 | 15.6 | 13.2 |
| $Al_2O_3$ (wt %) | 16 | 16.8 | | 16.5 | | 16.8 | 17 | 17 | 15.4 | 15.1 | 15.1 | 15.4 |
| MgO (wt %) | 3.95 | 3.9 | | 5 | | 4.5 | 4.5 | 4 | 4 | 4 | 3.9 | 6.4 |
| $K_2O$ (wt %) | 3.55 | 4.1 | | 4.2 | | 3 | 3 | 4 | 4.2 | 4.4 | 4.5 | 4 |
| CaO (wt %) | 0 | 0 | | 0 | | 1 | 0 | 0 | 0 | 1.7 | 2 | 0 |
| ZnO (wt %) | 0 | 0 | | 0 | | 0.5 | 0.6 | 0 | 0.2 | 1.2 | 0 | 1 |
| $ZrO_2$ (wt %) | 0 | 0 | | 0 | | 0 | 0 | 1.5 | 1 | 0 | 0.8 | 1.2 |
| $SnO_2$ (wt %) | 0.5 | 0.4 | | 0.5 | | 0.5 | 0.5 | 0.5 | 0.3 | 0.4 | 0.4 | 0.5 |
| $TiO_2$ (wt %) | 0 | 0.8 | | 0.5 | | 0 | 0.2 | 0 | 0 | 0 | 0.2 | 0 |
| $CeO_2$ (wt %) | 0 | 0.1 | | 0 | | 0 | 0 | 0 | 0.1 | 0 | 0 | 0 |
| $Na_2O + K_2O + MgO + ZnO + CaO$ (wt %) | 20.5 | 20.2 | | 21.8 | | 22 | 21.3 | 20 | 23.6 | 26.5 | 26.0 | 24.6 |
| Glass thickness (mm) | 0.7 | 0.7 | 0.7 | 0.5 | 0.3 | 0.7 | 0.7 | 0.7 | 0.7 | 0.7 | 0.7 | 0.7 |
| Density (g/cm$^3$) | 2.45 | 2.46 | 2.47 | 2.47 | 2.47 | 2.48 | 2.47 | 2.47 | 2.48 | 2.51 | 2.5 | 2.49 |
| $T_g$(° C.) | 590 | 605 | 608 | 608 | 608 | 609 | 610 | 615 | 558 | 549 | 552 | 599 |
| CTE ($10^{-6}$/° C.) | 8.7 | 8.6 | 8.9 | 8.9 | 8.9 | 8.6 | 8.6 | 8.7 | 9.9 | 10.4 | 10.5 | 9.3 |
| ion exchange temperature (° C.) | 390 | 420 | 400 | 400 | 400 | 410 | 410 | 410 | 410 | 410 | 410 | 410 |
| Time (hours) | 2 | 3 | 1 | 1 | 1 | 4 | 4 | 4 | 2 | 2 | 2 | 2 |
| DoL (μm) | 20 | 35 | 15 | 15 | 15 | 22 | 20 | 30 | 12 | 12 | 15 | 15 |
| compressive stress (MPa) | 820 | 800 | 850 | 850 | 850 | 1100 | 1050 | 930 | 800 | 800 | 850 | 800 |
| Ball drop test (mm) | 788 | 650 | 750 | 400 | 300 | 800 | 750 | 850 | 600 | 640 | 650 | 750 |
| Ring-on-ring test (N) | 1820 | 1724 | 1925 | 908 | 650 | 1800 | 1620 | 1850 | 1050 | 900 | 1250 | 1300 |

TABLE 2

Comparative examples of glass compositions and properties, and parameters for chemical strengthening

| | Glass 1 | Glass 2 | Glass 3 |
|---|---|---|---|
| $SiO_2$ (wt %) | 70 | 80.7 | 65.4 |
| $Na_2O$ (wt %) | 13 | 3.5 | 13.3 |
| $Al_2O_3$ (wt %) | 2 | 2.5 | 7.7 |
| $B_2O_3$ (wt %) | 0 | 12.7 | 1 |
| MgO (wt %) | 4 | 0 | 5.1 |
| $K_2O$ (wt %) | 1 | 0.6 | 4 |
| CaO (wt %) | 10 | 0 | 0 |
| ZnO (wt %) | 0 | 0 | 3 |
| $ZrO_2$ (wt %) | 0 | 0 | 0 |
| $SnO_2$ (wt %) | 0 | 0 | 0.5 |
| $TiO_2$ (wt %) | 0 | 0 | 0 |
| $CeO_2$ (wt %) | 0 | 0 | 0 |
| Density (g/cm$^3$) | 2.50 | 2.22 | 2.52 |
| $T_g$ (° C.) | 560 | 525 | 500 |
| CTE ($10^{-6}$/° C.) | 8.9 | 3.25 | 9.0 |
| Ion-exchange temperature (° C.) | 390 | 390 | 390 |
| Time (hours) | 2 | 2 | 5 |
| DoL (μm) | 6 | 5 | 20 |
| Compressive stress (MPa) | 550 | 300 | 600 |
| Ball drop test (mm) | 350 | 300 | 400 |
| Ring-on-ring test (N) | 1150 | 940 | 1200 |

TABLE 3

Examples of antibacterial experiment

| | Example 1 | Example 2 | Example 3 |
|---|---|---|---|
| $SiO_2$ (wt %) | 63 | 61.7 | 60.7 |
| $Na_2O$ (wt %) | 13 | 12.2 | 12.6 |
| $Al_2O_3$ (wt %) | 16 | 16.8 | 16.5 |

TABLE 3-continued

| Examples of antibacterial experiment | | | |
|---|---|---|---|
| | Example 1 | Example 2 | Example 3 |
| MgO (wt %) | 3.95 | 3.9 | 5 |
| $K_2O$ (wt %) | 3.55 | 4.1 | 4.2 |
| CaO (wt %) | 0 | 0 | 0 |
| ZnO (wt %) | 0 | 0 | 0 |
| $ZrO_2$ (wt %) | 0 | 0 | 0 |
| $SnO_2$ (wt %) | 0.5 | 0.4 | 0.5 |
| $TiO_2$ (wt %) | 0 | 0.8 | 0.5 |
| $CeO_2$ (wt %) | 0 | 0.1 | 0 |
| $Na_2O + K_2O + MgO + ZnO + CaO$ (wt %) | 20.5 | 20.2 | 21.8 |
| Molten salt composition ($AgNO_3$:$KNO_3$) | 4% | 8% | 4.5% |
| Temperature (° C.) | 390 | 420 | 400 |
| Time (hours) | 2 | 3 | 1 |
| Transmissivity (T %, 550 nm) | 91% | 89% | 90.5% |
| Weight percetage of $Ag_2O$ within a depth of 2 micrometers in the surface layer of glass | 1% | 2% | 1.2% |
| Passing antibacterial test or not (ASTM 2180-01) | Yes | | |
| Passing antibacterial test or not (JCT 1054-2007) | | Yes | Yes |

The invention claimed is:

1. An antibacterial strengthened aluminosilicate glass plate, comprising the following components, calculated based upon weight percentage (wt %), of:

| | |
|---|---|
| $SiO_2$ | 55 to 65 |
| $Na_2O$ | greater than 12 to 17 |
| $Al_2O_3$ | 16.5 to 20 |
| $K_2O$ | 2 to 4.4 |
| MgO | 3.9 to 10 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | less than or equal to 1, |

wherein the aluminosilicate glass plate has been subjected to ion exchange strengthening in a 100% $KNO_3$ salt bath for a period of time from 0.5 to 16 hours after preheating to a temperature from 370° C. to 430° C., wherein silver nitrate is added to the $KNO_3$ salt bath at a weight percentage of 0.1 to 15% based on a total weight of molten salt, and wherein the aluminosilicate glass plate is free of $B_2O_3$.

2. The aluminosilicate glass plate according to claim 1, wherein $SiO_2$ has an amount of 58 to 63 wt %.

3. The aluminosilicate glass plate according to claim 1, wherein $Na_2O$ has an amount of greater than 12 to 15 wt %.

4. The aluminosilicate glass plate according to claim 1, wherein $K_2O$ has an amount of 3 to 4.4 wt %.

5. The aluminosilicate glass plate according to claim 1, wherein $Al_2O_3$ has an amount of 16.5 to 17 wt %.

6. The aluminosilicate glass plate according to claim 1, wherein MgO has an amount of 3.9 to 8.0 wt %.

7. The aluminosilicate glass plate according to claim 1, wherein ZnO and CaO each have an amount of lower than 2 wt %.

8. The aluminosilicate glass plate according to claim 1, wherein $ZrO_2$ has an amount of 0.1 to 3 wt %.

9. The aluminosilicate glass plate according to claim 1, wherein the sum of the amounts of components $Na_2O$ +$K_2O$ +MgO +ZnO +CaO is 15 to 25 wt %.

10. The aluminosilicate glass plate according to claim 1, wherein the temperature ranges from 390 to 410° C. and the treatment time ranges from 1 to 3hours.

11. The aluminosilicate glass plate according to claim 1, wherein, after ion exchange, the aluminosilicate glass plate has a compressive stress of 600 to 1000 MPa.

12. The aluminosilicate glass plate according to claim 1, wherein, after ion exchange, the aluminosilicate glass plate has a depth of ion exchange layer (DoL) of 10 to 80 μm.

13. The aluminosilicate glass plate according to claim 12, wherein, after ion exchange, the aluminosilicate glass plate has a DoL of 10 to 20 μm.

14. The aluminosilicate glass plate according to claim 1, wherein, after ion exchange, the aluminosilicate glass plate with a thickness of 0.3 mm has a breakage height of ball drop strength test of 200 to 400 mm and a ring-on-ring breakage force of 400 to 1000 N.

15. The aluminosilicate glass plate according to claim 1, wherein, after ion exchange, the aluminosilicate glass plate with a thickness of 0.5 mm has a breakage height of ball drop strength test of 300 to 500 mm and a ring-on-ring breakage force of 500 to 1,200 N.

16. The aluminosilicate glass plate according to claim 1, wherein, after ion exchange, the aluminosilicate glass plate with a thickness of 0.7 mm has a breakage height of ball drop strength test of 400 to 1,000 mm and a ring-on-ring breakage force of 1,000 to 4,000 N.

17. The aluminosilicate glass plate according to claim 1, wherein, after ion exchange, the aluminosilicate glass plate has a central tension that is lower than 60 MPa.

18. The aluminosilicate glass plate according to claim 1, wherein, after ion exchange, the aluminosilicate glass plate has a central tension that is lower than 30 MPa.

19. The aluminosilicate glass plate according to claim 1, wherein the plate is a float glass plate.

20. The aluminosilicate glass plate according to claim 1, wherein the plate has a thickness of 0.5 mm to 20 mm.

21. The aluminosilicate glass plate according to claim 1, wherein the plate is a down-draw plate.

22. The aluminosilicate glass plate according to claim 21, wherein the plate has a thickness from 0.1 to 1.5 mm.

23. The aluminosilicate glass plate according to claim 1, wherein the aluminosilicate glass plate is used as a touch screen.

24. The aluminosilicate glass plate according to claim 1, wherein the aluminosilicate glass plate is used in a mobile electronic device.

25. An antibacterial strengthened aluminosilicate glass plate comprising the following components, calculated based upon weight percentage (wt %):

| | |
|---|---|
| $SiO_2$ | 56 to 64 |
| $Na_2O$ | 12.1 to 16.5 |
| $Al_2O_3$ | 16.5 to 19.0 |
| $K_2O$ | 2.5 to 4.4 |
| MgO | 3.9 to 9.0 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | less than or equal to 1, |

wherein the aluminosilicate glass plate has been subjected to ion exchange strengthening in a 100% $KNO_3$ salt bath for a period of time from 0.5 to 16 hours after preheating to a temperature from 370° C. to 430° C., wherein silver nitrate is added to the $KNO_3$ salt bath at a weight percentage of 0.1 to 15% based on a total weight of molten salt, and wherein the aluminosilicate glass plate is free of $B_2O_3$.

26. An antibacterial strengthened aluminosilicate glass plate comprising the following components, calculated based upon weight percentage (wt %):

| | |
|---|---|
| $SiO_2$ | 57 to 63 |
| $Na_2O$ | 12.1 to 16.0 |
| $Al_2O_3$ | 16.5 to 18.5 |
| $K_2O$ | 2.8 to 4.4 |
| MgO | 4.0 to 9.0 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $SnO_2$ | 0 to 1 |
| $TiO_2 + CeO_2$ | less than or equal to 1, |

wherein the aluminosilicate glass plate has been subjected to ion exchange strengthening in a 100% $KNO_3$ salt bath for a period of time from 0.5 to 16 hours after preheating to a temperature from 370° C. to 430° C., wherein silver nitrate is added to the $KNO_3$ salt bath at a weight percentage of 0.1 to 15% based on a total weight of molten salt, and wherein the aluminosilicate glass plate is free of $B_2O_3$.

* * * * *

UNITED STATES PATENT AND TRADEMARK OFFICE

CERTIFICATE OF CORRECTION

PATENT NO. : 9,212,084 B2
APPLICATION NO. : 13/515227
DATED : December 15, 2015
INVENTOR(S) : Wang et al.

It is certified that error appears in the above-identified patent and that said Letters Patent is hereby corrected as shown below:

Title Page

Under "Assignee":

Item (73) - please correct: "SCHOTT GLASS TECHNOLOGIES (SUZHOU) CO. LTD." to -- SCHOTT AG, Mainz (DE) and SCHOTT GLASS TECHNOLOGIES (SUZHOU) CO. LTD., Jiangsu (CN) --.

Signed and Sealed this
Sixteenth Day of August, 2016

Michelle K. Lee
*Director of the United States Patent and Trademark Office*